(12) United States Patent
Nakajima et al.

(10) Patent No.: US 8,709,668 B2
(45) Date of Patent: Apr. 29, 2014

(54) HYDROGEN GENERATION DEVICE AND FUEL CELL SYSTEM

(75) Inventors: Tomoyuki Nakajima, Hyogo (JP); Hidenobu Wakita, Kyoto (JP); Seiji Fujihara, Osaka (JP); Yukimune Kani, Osaka (JP)

(73) Assignee: Panasonic Corporation, Osaka (JP)

( * ) Notice: Subject to any disclaimer, the term of this patent is extended or adjusted under 35 U.S.C. 154(b) by 162 days.

(21) Appl. No.: 13/518,466

(22) PCT Filed: Aug. 2, 2011

(86) PCT No.: PCT/JP2011/004371
§ 371 (c)(1),
(2), (4) Date: Jun. 22, 2012

(87) PCT Pub. No.: WO2012/017642
PCT Pub. Date: Feb. 9, 2012

(65) Prior Publication Data
US 2012/0270121 A1    Oct. 25, 2012

(30) Foreign Application Priority Data
Aug. 3, 2010   (JP) .................. 2010-174060

(51) Int. Cl.
*H01M 8/06*   (2006.01)

(52) U.S. Cl.
USPC .......................................... 429/413

(58) Field of Classification Search
None
See application file for complete search history.

(56) References Cited

U.S. PATENT DOCUMENTS

2005/0073289 A1   4/2005   Takada et al.

FOREIGN PATENT DOCUMENTS

| JP | 2000-256003 A | 9/2000 |
| JP | 2003-095607 A | 4/2003 |
| JP | 2004-292290 A | 10/2004 |
| JP | 2005-115553 A | 4/2005 |
| JP | 2007-137719 A | 6/2007 |
| JP | 2008-214121 A | 9/2008 |

OTHER PUBLICATIONS

International Search Report for corresponding International Application No. PCT/JP2011/004371 mailed Sep. 13, 2011.
Form PCT/IPEA/416 and Form PCT/IPEA/409 for corresponding International Application No. PCT/JP2011/004371 dated Mar. 6, 2012.

*Primary Examiner* — Patrick Ryan
*Assistant Examiner* — Wyatt McConnell
(74) *Attorney, Agent, or Firm* — Renner, Otto, Boisselle & Sklar, LLP

(57) ABSTRACT

A hydrogen generation apparatus 100 of the present invention includes: a reformer 4 for generating a hydrogen-containing gas through a reforming reaction using a raw material gas; a raw material gas supplier 13 for supplying the raw material gas to the reformer 4; a methanator 6 for reducing carbon monoxide contained in the hydrogen-containing gas through a methanation reaction; and a controller for controlling the raw material gas supplier 13 to decrease an amount of the raw material gas supplied to the reformer 4 so as to decrease an amount of generation of the hydrogen-containing gas when a temperature of the methanator 6 increases.

8 Claims, 5 Drawing Sheets

HYDROGEN GENERATION DEVICE AND FUEL CELL SYSTEM

TECHNICAL FIELD

The present invention relates to a hydrogen generation apparatus and a fuel cell system.

BACKGROUND ART

At present, hydrogen gas supply systems have not been developed as a common infrastructure. Therefore, with devices that require hydrogen in large amounts, e.g., fuel cell systems which are being developed and commercialized as distributed power generation apparatuses, it is often the case that a hydrogen generation apparatus is provided individually at the site where the device is installed.

A hydrogen generation apparatus includes a reformer for generating a reformed gas containing hydrogen through a steam reforming reaction between a hydrocarbon-type raw material, such as city gas or LPG (liquefied petroleum), and steam. The components of the reformed gas generated by the reformer are hydrogen, methane, carbon monoxide, carbon dioxide, and steam. Carbon monoxide (CO) contained in the reformed gas has a poisoning effect on the electrode catalyst of the fuel cell. In view of this, a CO remover for removing carbon monoxide from a hydrogen-containing gas is normally provided downstream of the reformer.

Various types of fuel cells have been in use. Currently, the most prevalent for household use is the solid polymer fuel cell. Where a solid polymer fuel cell is used, in order to suppress poisoning of the electrode (anode) catalyst, CO removal is necessary so that the concentration of CO contained in the reformed gas is about 500 ppm or less, and preferably 10 ppm or less.

Therefore, the CO concentration in the reformed gas cannot sufficiently be reduced only by providing an shift converter for removing CO from the reformed gas through a CO shift reaction, as the CO remover of the hydrogen generation apparatus. In view of this, it is preferred that an oxidizer filled with an oxidation catalyst or a methanator filled with a methanation catalyst is provided, as the CO remover, downstream of the shift converter. With an oxidizer, a very small amount of air is added to the reformed gas to selectively oxidize CO, thereby further removing CO contained in the reformed gas after shift convertion. On the other hand, with a methanator, CO in the reformed gas is methanated and thus removed. Thus, the reformed gas whose CO concentration has been reduced through a shift converter and a CO cleaner is supplied to the anode (fuel electrode) of the fuel cell, thereby preventing the poisoning of the electrode catalyst.

However, if an oxidizer is provided as the CO cleaner, it is necessary to introduce air into the reformed gas, which may complicate the configuration of the hydrogen generation apparatus. On the other hand, if a methanator is provided, there is no need to an element for introducing air into the reformed gas, and therefore the apparatus configuration can be made simple.

A fuel cell system including a methanator as the CO cleaner is disclosed in Patent Document No. 1, for example.

CITATION LIST

Patent Literature

Patent Document No. 1: Japanese Laid-Open Patent Publication No. 2000-256003

SUMMARY OF INVENTION

Technical Problem

With a hydrogen generation apparatus including a methanator, CO contained in the reformed gas is selectively methanated (CO selectivity) if the temperature of the methanation catalyst is within a predetermined range. However, if the temperature of the methanation catalyst is significantly higher than a predetermined temperature, the CO selectivity decreases, and the methanation reaction of $CO_2$, which is a side reaction, proceeds, whereby the temperature further increases due to heat generation from the side reaction, accelerating the side reaction. If the side reaction is accelerated, it becomes difficult to control the temperature of the hydrogen generation apparatus, and the catalyst performance of the methanation catalyst decreases substantially.

In contrast, a configuration in which a cooling means for cooling the methanator has been proposed. For example, Patent Document No. 1 proposes supplying the air for combustion around the reaction container accommodating the methanation catalyst, thereby cooling the methanation catalyst through heat exchange. However, there is not so much consideration as to how to suppress the temperature increase of the methanator by a method different from the method of using the cooling means.

The present invention aims at solving the problem set forth above by providing a method different from conventional hydrogen generation apparatuses, as a method for suppressing the temperature increase of the methanator.

Solution to Problem

A hydrogen generation apparatus of the present invention includes: a reformer for generating a hydrogen-containing gas through a reforming reaction using a raw material gas; a raw material gas supplier for supplying the raw material gas to the reformer; a methanator for reducing carbon monoxide contained in the hydrogen-containing gas through a methanation reaction; and a controller for controlling the raw material gas supplier to decrease an amount of the raw material gas supplied to the reformer so as to decrease an amount of generation of the hydrogen-containing gas when a temperature of the methanator increases.

In a preferred embodiment, the hydrogen generation apparatus includes a steam supplier for supplying the steam; and when the temperature of the methanator increases, the controller controls the steam supplier to increase an amount of steam supplied to the reformer so that a steam/carbon ratio of the raw material gas and the steam supplied to the reformer becomes higher than the steam/carbon ratio before decreasing the amount of generation of the hydrogen-containing gas.

In a preferred embodiment, when the temperature of the methanator increases, the controller controls the steam supplier to increase an amount of steam supplied to the reformer so as to increase the steam/carbon ratio in accordance with an amount of decrease in the raw material gas.

In a preferred embodiment, the hydrogen generation apparatus includes a steam supplier for supplying the steam; and when the temperature of the methanator increases, the controller controls the raw material gas supplier and the water supplier to decrease amounts of the raw material gas and the steam supplied to the reformer so as to decrease the amount of generation of the hydrogen-containing gas through the reforming reaction while maintaining the steam/carbon ratio of the raw material gas and the steam supplied to the reformer.

In a preferred embodiment, when the temperature of the methanator decreases, the controller lifts a limitation on the amount of generation of the hydrogen-containing gas.

In a preferred embodiment, when the temperature of the methanator decreases, the controller controls the steam supplier so that the steam/carbon ratio of the raw material gas and the steam supplied to the reformer becomes equal to the steam/carbon ratio before decreasing the amount of generation of the hydrogen-containing gas.

In a preferred embodiment, when the temperature of the methanator further increases, the raw material gas supplier is controlled so as to stop the supply of the raw material gas to the reformer.

A fuel cell system of the present invention includes any one of the hydrogen generation apparatuses set forth above; and a fuel cell for generating electric power using a hydrogen-containing gas supplied from the hydrogen generation apparatus.

In a preferred embodiment, when the temperature of the methanator increases, a power generation output of the fuel cell system is lowered.

In a preferred embodiment, the fuel cell system further includes a storage battery; and when the power generation output of the fuel cell system is lowered, electric power stored in advance in the storage battery is discharged.

Advantageous Effects of Invention

According to the present invention, when the temperature of the methanator increases, it is possible to shift the equilibrium of the CO and $CO_2$ methanation reactions in such a direction as to suppress methanation. Thus, it is possible to suppress the amount of heat generation from the methanation reaction, thereby suppressing an increase in the temperature of the methanator.

DESCRIPTION OF EMBODIMENTS

First Embodiment

Hereinafter, the hydrogen generation apparatus according to a first embodiment of the present invention will be described.

Figure 1:
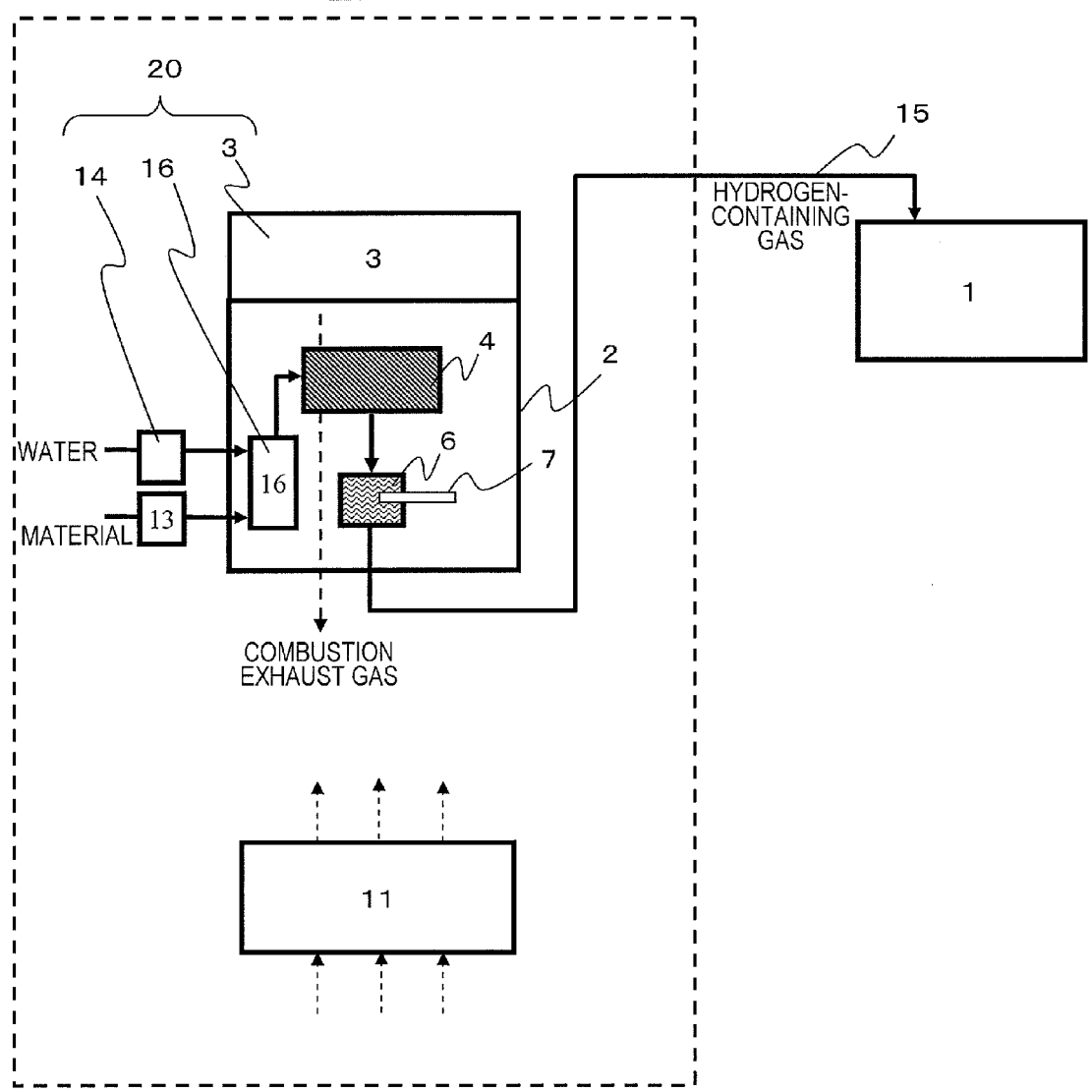
FIG. 1 A diagram showing a configuration of a hydrogen generation apparatus of a first embodiment.

FIG. 1 is a schematic diagram showing an example of a hydrogen generation apparatus of an embodiment of the present invention.

A hydrogen generation apparatus 100 includes a hydrogen generator 2 for generating a hydrogen-containing gas using a raw material, a raw material gas supplier 13 for supplying the raw material to the hydrogen generator 2, a steam supplier 20 for supplying steam to the hydrogen generator 2, a controller 11 for controlling the operation of the raw material gas supplier 13 and the steam supplier 20.

In the present embodiment, the steam supplier 20 is composed of a water supplier 14, an evaporator 16 for evaporating the water supplied from the water supplier 14 to generate steam, and a heater (a burner 3 in this example) for heating the evaporator 16. While the heater for heating the evaporator 16 is the burner 3 in this example, this is merely an example and is not limited thereto. For example, the heater may be an electric heater, or the like.

The hydrogen generator 2 includes a reformer 4 and a methanator 6.

The reformer 4 generates a hydrogen-containing gas containing carbon monoxide (CO) through a reforming reaction (steam reforming reaction) between the raw material supplied from the raw material gas supplier 13 and the steam supplied from the steam supplier 20. The reformer 4 is filled with a reforming catalyst for allowing a reforming reaction to proceed.

The methanator 6 methanates and removes CO remaining in the hydrogen-containing gas. A temperature sensor 7 is provided in the methanator 6.

A thermocouple, a thermistor, or the like, may be used as the temperature sensor 7 for detecting the temperature of the methanator 6. The temperature sensor 7 is not limited to these, and other sensors may be used.

For example, the temperature sensor 7 may be provided in a sleeve inserted into the methanation catalyst from outside and arranged so as to directly measure the temperature of the methanation catalyst. Alternatively, the temperature sensor 7 may be provided in contact with the outer wall of the structure accommodating the methanation catalyst to measure the temperature of the outer wall of the structure. Alternatively, the temperature sensor 7 may be used to measure the temperature of the gas on the outlet side or the inlet side of the methanation catalyst so as to detect the temperature of the methanator 6 from the temperature of the gas.

The temperature sensor 7 is an example of a detector for directly detecting the temperature of the methanator 6, and the detector is not limited thereto, but may be a detector that indirectly detects the temperature of the methanator 6. An example of a detector that indirectly detects the temperature of the methanator 6 is a detector that detects the composition of the gas on the outlet side (outlet gas) of the methanation catalyst. Specifically, the detector is a detector for detecting the methane concentration of the outlet gas, such as a frame rod, etc., and when the methane concentration increases, the controller 11 determines that the temperature of the methanator 6 has increased due to the increase in the reaction heat of the methanation reaction. In the present embodiment, the "temperature of the methanator 6" refers to the temperature of the methanation catalyst, the temperature of the structure accommodating the methanation catalyst, or the temperature in the vicinity of the methanation catalyst that changes in response to the temperature of the methanation catalyst.

The burner 3 supplies, to the reformer 4, the heat of reaction needed for the reforming reaction by the combustion exhaust gas. The hydrogen generation apparatus 100 of this example is configured so that the methanator 6 is heated by the combustion exhaust gas after heating the reformer 4. The hydrogen generation apparatus 100 is configured so as to heat the evaporator by the combustion exhaust gas after heating the reformer 4.

The hydrogen-containing gas having passed through the methanator 6 of the hydrogen generator 2 is sent to a hydrogen utilization device 1 by a hydrogen-containing gas passage 15. The hydrogen utilization device 1 may be any device that utilizes a hydrogen-containing gas, and may be a fuel cell, or a hydrogen storage container, for example.

The catalytic component used as the methanation catalyst is preferably one that is selectively active for methanation of CO, i.e., one that is active only for the hydrogenation reaction of CO, of $CO_2$ and CO of the hydrogen-containing gas, or one that is selectively active for the hydrogenation reaction of CO. Examples of such catalyst components include metals such as Pt, Ru, Rh, Pd, and Ni. Particularly, it is preferred that at least one metal of Ru, Rh and Ni is contained as a catalytic component.

There is no particular limitation on the support for a catalyst used as the methanation catalyst, and it may be any one that is capable of supporting an active component in a highly-dispersed state. Examples of such supports include alumina, silica, silica alumina, magnesia, zirconia, titania, and zeolite. The base material used for the methanation catalyst may be one with which it is possible to sufficiently ensure the contact area between the catalyst and the gas in the reaction chamber. A base material having a honeycomb shape or a foamed shape with through holes may be used preferably as such a base material. The base material may be in a pellet shape.

While the hydrogen generation apparatus 100 includes the methanator 6 provided downstream of the reformer 4, a device for reducing CO in the hydrogen-containing gas may be provided between the reformer 4 and the methanator 6. For example, the device may be a shift converter for reducing the CO concentration in the hydrogen-containing gas through a shift reaction.

In the present embodiment, when a temperature increase of the methanator 6 is detected, the controller 11 controls the raw material gas supplier 13 to decrease the amount of the raw material gas supplied to the reformer 4 so as to reduce the amount of the hydrogen-containing gas generated through a reforming reaction in the reformer 4. For example, the amount of the hydrogen-containing gas generated through a reforming reaction is reduced by reducing the flow rate of the raw material supplied from the raw material gas supplier 13 to the reformer 4. Thus, the methanation reaction is less likely to occur, and it is possible to suppress the temperature increase due to the heat of reaction of the methanation reaction (particularly, the methanation reaction of $CO_2$). The advantageous effects of the present embodiment will now be described in detail.

The hydrogen-containing gas supplied to the methanator 6 normally contains CO and $CO_2$. While the CO concentration in the hydrogen-containing gas is about 0.5% or less, for example, the $CO_2$ concentration is higher than the CO concentration and is 20%, for example.

If the temperature of the methanation catalyst is in a temperature range optimal for methanation of CO, the CO methanation reaction shown in Expression (1) proceeds preferentially while the $CO_2$ methanation reaction shown in Expression (2) is suppressed. That is, the CO methanation reaction proceeds selectively.

$$CO+3H_2 \mathrel{<=>} CH_4+H_2O \quad (1)$$

However, if the temperature of the methanation catalyst increases above the optimal temperature range, the $CO_2$ methanation shown in Expression (2) starts to accelerate.

$$CO_2+4H_2 \mathrel{<=>} CH_4+2H_2O \quad (2)$$

When the $CO_2$ methanation reaction shown in Expression (2) starts to accelerate, the amount of heat generation increases, thereby further increasing the temperature of the methanator 6. When the temperature of the methanator 6 increases, the equilibrium of Expression (2) shifts to the right, and the $CO_2$ methanation reaction is further accelerated. As a result, the temperature increase rate will be very high (e.g., 2.5° C./min), and it will exceed the heat resistant temperature of the methanation catalyst, leading to a deterioration, unless a countermeasure is taken to suppress the temperature increase. The heat resistant temperature is defined as the temperature of the methanation catalyst at which the lifetime guaranteed by the hydrogen generation apparatus can be maintained.

In the present embodiment, when the temperature increase of the methanator 6 is detected, the amount of the hydrogen-containing gas generated by the reformer 4 is decreased, and the amount of the hydrogen-containing gas supplied to the methanator 6 is decreased. Thus, in both of the reactions of Expressions (1) and (2) above, the equilibrium shifts to the left. As a result, the amount of heat generation from the methanation reaction is suppressed, and therefore the temperature of the methanator 6 decreases. If the temperature of the methanator 6 decreases, the reaction of Expression (2) (side reaction) is suppressed due to the temperature decrease, and it is therefore possible to further decrease the temperature of the methanator 6.

With a conventional hydrogen generation apparatus, if the temperature of the methanator increases, the only way is to remove the heat generated through the methanation reaction by a methanator cooling means as proposed in Patent Document No. 1. However, with the hydrogen generation apparatus of the present embodiment, it is possible to decrease the heat of reaction itself generated through the methanation reaction. Therefore, where the hydrogen generation apparatus of the present embodiment includes the cooling means, it is possible to decrease the amount of cooling by the cooling means and to reduce the electric power needed for cooling. Alternatively, the hydrogen generation apparatus of the present embodiment can suppress the temperature increase of the methanator 6 even without the cooling means.

Next, the operation method of the hydrogen generation apparatus 100 of the present embodiment will be described in greater detail.

In the present embodiment, the temperature of the methanation catalyst is measured by the temperature sensor 7 during the hydrogen-generating operation (the normal operation) of the hydrogen generation apparatus 100, and it is determined whether there is an increase in the temperature of the methanator 6 based on the measurement results. Herein, the temperature sensor 7 is arranged at a portion of the methanation catalyst located on the hydrogen-containing gas inlet side to measure the inlet temperature of the methanation catalyst. As CO in the hydrogen-containing gas flows into the methanator 6, it starts reacting on the methanation catalyst inlet side, the amount of methanation reaction is larger there than on the methanation catalyst outlet side. That is, since the amount of heat generation is larger on the methanation catalyst inlet side than on the outlet side, the temperature increase through the methanation reaction can be detected more quickly.

When it is determined that there is an increase in the temperature of the methanator 6, for example, the operation of the raw material gas supplier 13 is controlled to decrease at least the amount of raw material supplied to the reformer 4 to be less than that immediately before the determination that there is an increase in the temperature of the methanator 6, thereby decreasing the amount of the hydrogen-containing gas generated by the reformer 4. In the present embodiment, the amount of water supplied to the reformer 4 is decreased along with the decrease in the amount of the raw material supplied.

It may be determined that there is an increase in the temperature of the methanator 6 when the measured temperature increase rate (e.g., 3.5° C./min) exceeds a predetermined value. Herein, even after the generation of the hydrogen-containing gas is started in the hydrogen generation apparatus 100, the temperature of the methanator 6 is increased upon start-up until it reaches the control temperature of the methanator 6, whereby if the determination is made based on the temperature increase rate of the methanator 6, the control operation of decreasing the amount of generation of the hydrogen-containing gas will be performed frequently. Therefore, upon start-up of the hydrogen generation apparatus 100, it is preferred that it is determined whether the control operation is necessary based on the temperature of the methanator 6.

In the present specification, the "normal operation" means the hydrogen-generating operation where no increase in the temperature of the methanator 6 is being detected at the methanator 6. The flow rate of the raw material or the water during the normal operation is not constant, but may vary depending on start-up conditions, the combustion state of the burner 3, the power generation output settings, etc. The operation after the amount of generation of the hydrogen-containing gas is referred to as the "low hydrogen-containing gas operation". While the amount of generation of the hydrogen-containing gas during the low hydrogen-containing gas operation may not be constant, it is controlled so as to be less than the amount of the hydrogen-containing gas immediately before the determination that there is an increase in the temperature of the methanator 6.

If the amount of the hydrogen-containing gas generated by the reformer 4 is decreased, the amount of the hydrogen-containing gas supplied to the methanator 6 will also be decreased. As a result, as described above, in both of the reactions of Expressions (1) and (2) above, the equilibrium shifts to the left, and the temperature of the methanator 6 decreases.

As a specific example, after it is detected that the temperature of the methanation catalyst has increased up to 280° C., the amounts of the raw material gas and water supplied to the reformer 4 are reduced to ⅓, thereby actuating the low hydrogen-containing gas operation. By this operation, the temperature of the methanation catalyst can be decreased to 220° C., for example.

When it is determined that the temperature of the methanator 6 has decreased, the decreasing of the amount of the hydrogen-containing gas is stopped, lifting the limitation on the amount of hydrogen-containing gas generated (i.e., the limitation on the amount of the raw material gas supplied). Thus, the normal operation can resume again. Lifting the limitation on the amount of hydrogen-containing gas generated does not mean that the amount of hydrogen-containing gas is brought back to the amount of hydrogen-containing gas generated immediately before the start of the low hydrogen-containing gas operation. This means that there is no limitation on the amount of hydrogen-containing gas generated during the low hydrogen-containing gas operation, and that the amount of hydrogen-containing gas generated is determined in a similar manner to that during the normal operation. Therefore, after the lift, the amount of hydrogen-containing gas generated does not always have to be brought back to that immediately before the start of the low hydrogen-containing gas operation, but any appropriate amount of the hydrogen-containing gas is generated.

While an example in which the amounts of the raw material gas and water supplied are decreased when an increase in the temperature of the methanator 6 is detected has been described above, the control operation may be any control operation whereby the amount M0 of the hydrogen-containing gas generated in the reformer 4, i.e., the amount of the hydrogen-containing gas supplied to the methanator 6, is decreased. For example, only the amount of the raw material gas supplied to the reformer 4 may be decreased. In such a case, the amount of water may not be decreased or may be increased. The amount M0 of generation of the hydrogen-containing gas may be decreased stepwise depending on the temperature of the methanation catalyst.

When an increase in the temperature of the methanator 6 is detected, the controller 11 may control the raw material gas supplier 13 and the steam supplier 20 (herein, the water supplier 14) so as to decrease the amount M0 of the hydrogen-containing gas generated in the reformer 4 while maintaining the steam/carbon ratio (the ratio of the molecular count of the steam with respect to the number of carbon atoms; hereinafter referred to simply as the "S/C ratio") of the raw material gas and water supplied to the reformer 4.

Alternatively, during operation after an increase in the temperature of the methanator 6 is detected (the low hydrogen-containing gas operation), the raw material gas supplier 13 and the steam supplier 20 (herein, the water supplier 14) may be controlled so that the S/C ratio of the raw material gas and water supplied to the reformer 4 is higher than the S/C ratio before the low hydrogen-containing gas operation is performed (i.e., before the amount M0 of the hydrogen-containing gas generated is decreased). In such a case, the amounts of the raw material gas and water (steam) supplied to the reformer 4 may be both decreased, or only the amount of the raw material gas supplied may be decreased while the amount of water supplied is not decreased. Conversely, the amount of water supplied may be increased. Thus, as the steam concentration in the hydrogen-containing gas supplied to the methanator 6 increases, the equilibrium of the methanation reaction can be shifted further in the methanation-suppressing direction. Where the methanator 6 and the evaporator 16 for evaporating water are arranged so that heat can be exchanged therebetween, the temperature of the methanator 6 decreases from that during the normal operation by controlling S/C to be high as described above during the low hydrogen-containing gas operation, whereby it is possible to further suppress methanation.

Then, if it is determined that the temperature of the methanator 6 has decreased, the limitation on the amount of the hydrogen-containing gas generated in the reformer 4 may be lifted while controlling the raw material gas supplier 13 and the steam supplier 20 (herein, the water supplier 14) so that the S/C ratio is equal to the S/C ratio before the low hydrogen-containing gas operation is performed.

Where the S/C ratio is increased during operation after an increase in the temperature of the methanator 6 is detected, it is preferred to control the steam supplier 20 (herein, the water supplier 14) so that the S/C ratio is increased in accordance with the amount of decrease of the hydrogen-containing gas generated in the hydrogen generation apparatus 100. The amount of water supplied to the evaporator 16 when the amount of generation of the hydrogen-containing gas is large is greater than the amount of water supplied when the amount of generation of the hydrogen-containing gas is small. If S/C is increased when the amount of generation of the hydrogen-containing gas is large, condensed water may increase in the hydrogen generator 2, leading to passage occlusion, catalyst deterioration, etc., in the hydrogen generator 2. In view of this, by controlling the water supplier 14 so that the S/C ratio is increased in accordance with the amount of decrease of the hydrogen-containing gas generated in the hydrogen generation apparatus 100 as described above, it is possible to suppress the methanation reaction while reducing the possibility of problems such as the passage occlusion.

Although the amount of water supplied to the evaporator 16 by the water supplier 14 is herein adjusted in order to control the amount of steam supplied, it is possible instead to control the amount of generation of steam by adjusting the temperature of the evaporator 16 by controlling a heater (not shown), or to control both the amount of water supplied to the evaporator 16 by the water supplier 14 and the amount of heating of the heater in order to control the amount of steam supplied.

Whether the temperature of the methanator 6 is increasing can be detected, for example, based on the change in the detected temperature T of the temperature sensor 7. It may be determined that the temperature of the methanator 6 is increasing when the detected temperature T of the temperature sensor 7 arranged in the methanator 6 becomes greater than or equal to a predetermined upper-limit temperature T1 during the normal operation. Alternatively, it may be determined that the temperature of the methanator 6 is increasing when the temperature increase rate (° C./min) of the detected temperature T of the methanator 6 increases to be greater than or equal to a predetermined value TC1. It may be determined that the temperature of the methanator 6 is increasing when the detected temperature T of the methanator 6 is greater than or equal to the upper-limit temperature T1 and the temperature increase rate is greater than or equal to TC1. The upper-limit temperature is set to be a temperature lower than the heat resistant temperature of the methanation catalyst.

On the other hand, it may be determined that the temperature of the methanator 6 has decreased when the detected temperature T of the methanator 6 becomes less than or equal to a predetermined lower-limit temperature T2. Alternatively, it may be determined that the temperature of the methanator 6 has decreased when the rate of change (° C./min) of the temperature of the methanator 6 decreases to be less than or equal to a predetermined value TC2. Alternatively, it may be determined that the temperature of the methanator 6 has decreased when the detected temperature T of the methanator 6 becomes less than or equal to the lower-limit temperature T2 and the temperature change rate becomes less than or equal to TC2. Specific values of the upper-limit temperature T1 and the lower-limit temperature T2 or the predetermined values TC1 and TC2, etc., may differ depending on the type of the raw material gas or the methanation catalyst.

As an example, it may be determined that the temperature of the methanator 6 is increasing and a control operation may be performed so that the amount of generation of the hydrogen-containing gas is decreased when the rate of increase of the detected temperature T from the temperature sensor 7 becomes greater than or equal to 5.0° C./min (the upper-limit value TC1 of the temperature change rate) and the detected temperature T becomes greater than or equal to 280° C. (upper-limit temperature T1). The temperature value (the upper-limit temperature T1) used for the determination of whether there is an increase in the temperature of the methanator 6 and the range of temperature increase (the upper-limit value TC2 of the temperature change rate) can be determined arbitrarily and are not limited to the examples above. Then, it may be determined that the temperature of the methanator 6 has decreased and the amount of generation of the hydrogen-containing gas may be brought back to the amount of generation during the normal operation when, for example, the change in the detected temperature T from the temperature sensor 7 becomes generally flat (e.g., −1.0° C./min or more and 0° C./min or less) and the detected temperature T becomes less than or equal to 200° C., for example.

Figure 2:
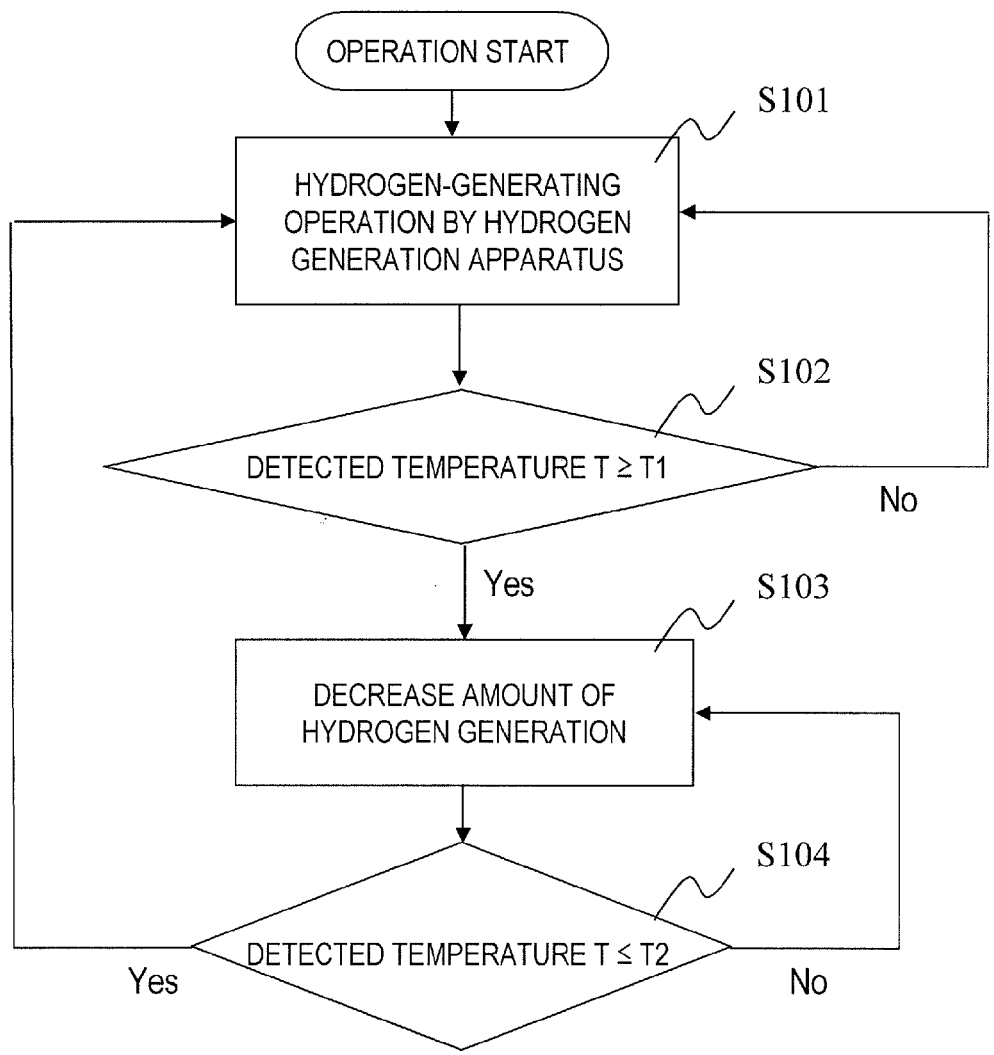
FIG. 2 A diagram showing a flow of the hydrogen generation apparatus of the first embodiment.

Here, referring to the flow of FIG. 2, an example of a method for operating the hydrogen generation apparatus 100 will be described.

First, the operation of the hydrogen generation apparatus is started, and the normal hydrogen-generating operation is performed (S101). During this operation, it is determined whether the detected temperature T of the temperature sensor 7 provided in the methanator 6 is greater than or equal to a predetermined upper-limit temperature T1 (TT1) (S102). If the detected temperature T is less than the upper-limit temperature T1, the normal hydrogen-generating operation is continued. On the other hand, if the detected temperature T is greater than or equal to the upper-limit temperature T1, it is believed that there is an increase in the temperature of the methanator, and therefore the low hydrogen-containing gas operation is performed by lowering the amount of the hydrogen-containing gas generated in the reformer 4 (S103).

During the low hydrogen-containing gas operation (S103), it is determined whether the detected temperature T of the temperature sensor 7 is less than or equal to a predetermined lower-limit temperature T2 (T≤T2) (S104). The low hydrogen-containing gas operation is continued if the detected temperature T is higher than the lower-limit temperature T2. On the other hand, if the detected temperature T is less than or equal to the lower-limit temperature T2, it is believed that the temperature of the methanator 6 has decreased, and therefore the normal hydrogen-generating operation is performed (S101).

The method for detecting an increase in the temperature of the methanator 6 is not limited to the detection method based on the change in the temperature of the methanator 6 described above. For example, it can be detected based on the change in the concentration of methane contained in the gas having passed through the methanator 6. The change in the methane concentration can be measured by using a frame rod, for example. The amount of methane generation increases as the $CO_2$ methanation reaction (Expression (2)), which is a side reaction, starts to proceed. Therefore, at a point in time when the methane concentration starts to increase during the normal operation, the heat of reaction of the methanation reaction increases, whereby it is possible to determined that there is an increase in the temperature of the methanator 6. It may be determined that the temperature of the methanator 6 has decreased when the methane concentration becomes lower than a predetermined value during the low hydrogen-containing gas operation.

Alternatively, an increase in the temperature of the methanator 6 can be detected based on the change in the concentration of hydrogen contained in the gas having passed through the methanator 6. As the $CO_2$ methanation reaction starts to proceed, the amount of hydrogen contained in the hydrogen-containing gas decreases because hydrogen is used in the methanation reaction. Therefore, it is possible to measure the change in the concentration of hydrogen contained in the gas having passed through the methanator 6 using a hydrogen sensor, for example, so that it can be determined that there is an increase in the temperature of the methanator 6 due to an increase in the heat of reaction of the methanation reaction at a point in time when the hydrogen concentration decreases. During the low hydrogen-containing gas operation, it may be determined that the temperature of the methanator 6 has decreased when the concentration of hydrogen in the gas having passed through the methanator 6 becomes higher than a predetermined value.

Where a fuel cell is used as the hydrogen utilization device 1, the power generation output by the fuel cell may be measured so that it is determined that there is an increase in the temperature of the methanator 6 at a point in time when the power generation output decreases. This is because as described above, as the $CO_2$ methanation reaction starts to proceed, the concentration of hydrogen in the gas supplied to the fuel cell after having passed through the methanator 6 decreases, thereby lowering the power generation output.

An increase in the temperature of the methanator 6 may be detected by any one of the detection methods illustrated above, or may be detected by a combination of a plurality of detection methods. As long as an increase in the temperature of the methanator 6 can be detected, the method is not limited to those illustrated above, but may be any other detection method.

For an efficient methanation reaction with a methanation catalyst, it is preferred that the temperature of the methanator 6 is not influenced by the external environment. For example, the methanator 6 may include a sufficiently thermally insulated container, a methanation catalyst filling the inside of the container, and a temperature adjustment means for keeping the inside of the container at a constant temperature.

The temperature adjustment means of the methanator 6 may include, for example, a heating means for heating the methanator 6 and a cooling means for cooling the methanator 6, and may be configured so that the temperature of the methanation catalyst is adjusted to a predetermined temperature range. The temperature adjustment means may use a heater system, a cooling system using a cooling fan, and a heat medium such as an oil. Alternatively, the methanator 6 may be cooled by passing the air around the container accommodating the methanation catalyst, as in Patent Document No. 1.

It is possible to more quickly suppress the increase in the temperature of the methanator 6 by using a cooling means (air cooling, etc.) for cooling the methanator 6 using heat exchange together with the control method of the present embodiment. The low hydrogen-containing gas operation is not preferred because the amount of generation of the hydrogen-containing gas is limited during this operation than during the normal operation. Here, by also using cooling by the cooling means, it is possible to bring it back to the normal operation more quickly.

With the hydrogen generation apparatus 100 of the present embodiment, there are cases where the temperature increase in the methanator 6 does not stop even if the low hydrogen-containing gas operation is performed. In such a case, it is preferred to stop the supply of the hydrogen-containing gas to the methanator 6. For example, when the detected temperature T from the temperature sensor 7 is 280° C. or more, and the increase in the detected temperature T does not stop after passage of a predetermined period (e.g., 5 min), it may be determined to be an abnormality (a state where the $CO_2$ methanation reaction has been accelerated), and a control operation may be performed to stop the supply of the hydrogen-containing gas.

The configuration of the hydrogen generation apparatus 100 of the present embodiment is not limited to that shown in FIG. 1. The reformer 4 and the methanator 6 do not have to be incorporated integrally together in the same container. The hydrogen generation apparatus 100 may be configured so that the hydrogen-containing gas generated through a reforming reaction in the reformer 4 is supplied to the methanator 6.

Second Embodiment

Hereinafter, a fuel cell system according to a second embodiment of the present invention will be described. The fuel cell system of the present embodiment includes the hydrogen generation apparatus 100 described above with reference to FIG. 1, and a fuel cell as a hydrogen utilization device for utilizing hydrogen generated in the hydrogen generation apparatus 100.

Figure 3:
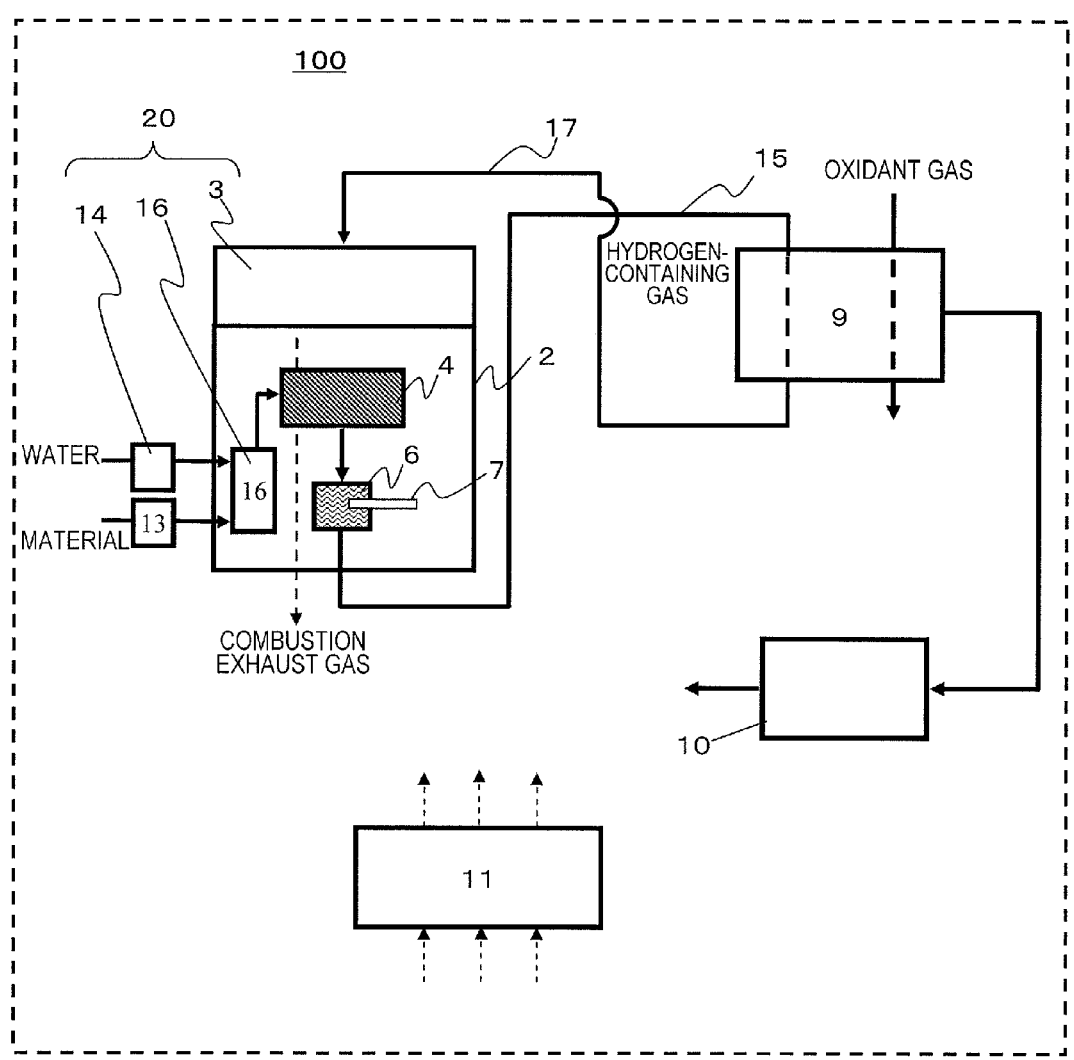
FIG. 3 A diagram showing a configuration of a fuel cell system of a second embodiment.

FIG. 3 is a schematic diagram showing an example of the fuel cell system of the present embodiment. For the sake of simplicity, like elements to those of FIG. 1 will be denoted by like reference numerals and will not be described below.

A fuel cell system 200 includes the hydrogen generation apparatus 100, a fuel cell 9 for generating electric power using the hydrogen-containing gas generated in the hydrogen generation apparatus 100, and an inverter 10. The hydrogen generation apparatus 100 includes the hydrogen generator 2, the raw material gas supplier 13 for supplying a raw material to the hydrogen generator 2, the steam supplier 20 for supplying steam to the hydrogen generator 2, and the controller 11. The steam supplier 20 of the present embodiment is similar to the first embodiment, and is composed of the water supplier 14, the evaporator 16 for evaporating water supplied by the water supplier 14, and a heater (not shown) for heating the evaporator 16.

In the present embodiment, the hydrogen-containing gas generated in the hydrogen generator 2 is sent to the anode of the fuel cell (stack) 9 by the hydrogen-containing gas passage 15. Oxygen (herein, an oxidant gas) is sent to the cathode of the fuel cell 9. The fuel cell 9 generates electric power by allowing a reaction between hydrogen in the hydrogen-containing gas and oxygen in the oxidant gas. In the present embodiment, a PEFC (solid polymer fuel cell) is used as the fuel cell 9.

An off-gas (anode off-gas) is discharged from the anode of the fuel cell 9. In the present embodiment, the anode off-gas is sent to the burner 3 by an off-gas passage 17, and used as a combustion gas.

The electric power obtained by the fuel cell 9 is converted to an alternating current by the inverter 10 so as to be used in, for example, household electric devices, etc.

The controller 11 of the present embodiment is configured to control the raw material gas supplier 13 and the steam supplier 20 to adjust the flow rate of the raw material gas or water supplied to the hydrogen generator 2. It may be configured to further control the inverter 10 to adjust the target value of the power generation output of the fuel cell system 200.

Also in the present embodiment, as in the embodiment described above, when an increase in the temperature of the methanator 6 is detected, the controller 11 controls the operation of the raw material gas supplier 13, for example, to decrease the flow rate of the raw material supplied from the raw material gas supplier 13 to the reformer 4. Thus, since the amount of the hydrogen-containing gas generated in the reformer 4 decreases, the methanation reaction is less likely to occur, and it is possible to suppress a temperature increase due to the methanation reaction (particularly, the $CO_2$ methanation reaction).

Third Embodiment

Hereinafter, a fuel cell system according to a third embodiment of the present invention will be described. The fuel cell system of the present embodiment differs from the fuel cell system 200 described above with reference to FIG. 3 in that a control operation is performed so as to lower the power generation output of the fuel cell system when an increase in the temperature of the methanator 6 is detected, and that a storage battery for storing the electric power obtained by the fuel cell is provided.

Figure 4:
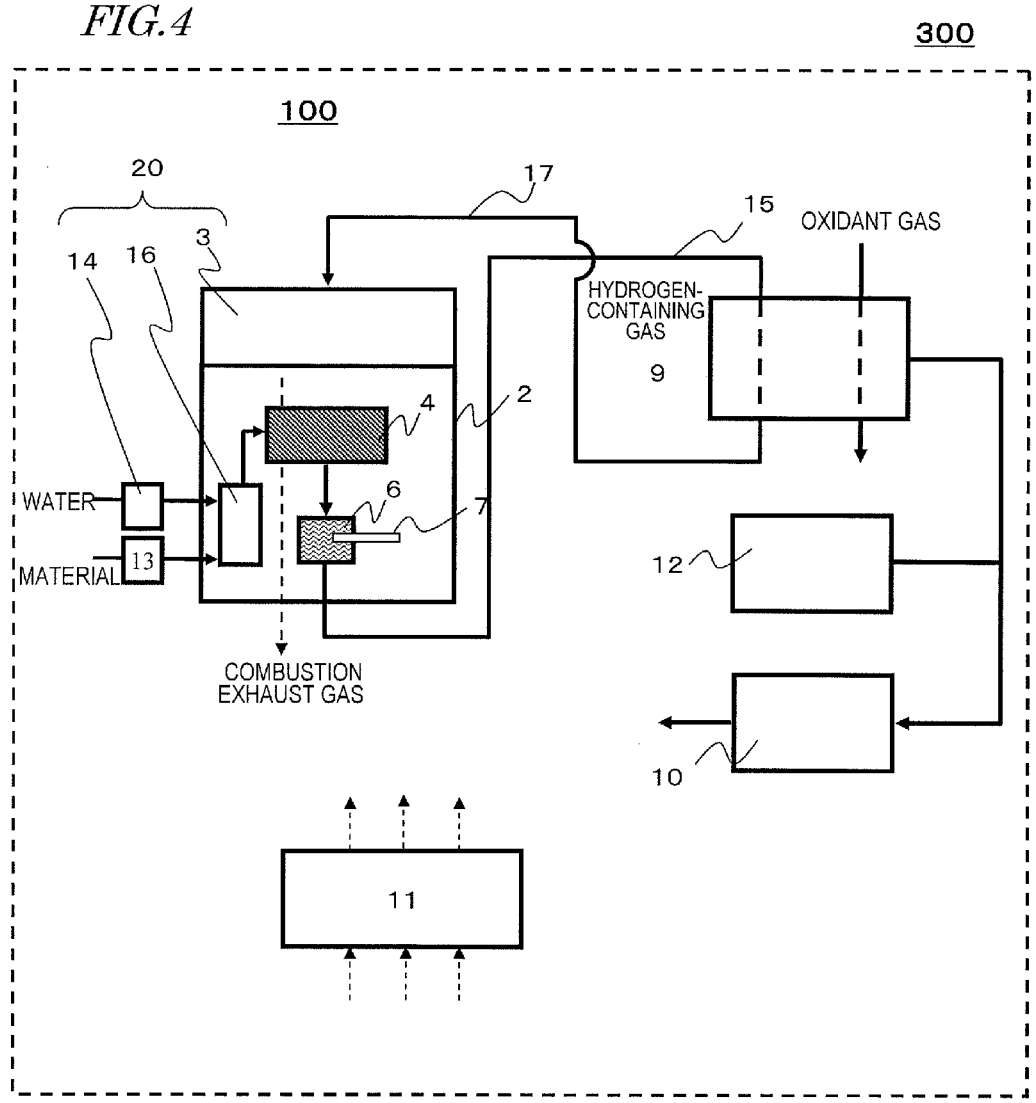
FIG. 4 A diagram showing a configuration of a fuel cell system of a third embodiment.

FIG. 4 is a schematic diagram showing an example of the fuel cell system of the present embodiment. For the sake of simplicity, like elements to those of FIG. 3 will be denoted by like reference numerals and will not be described below.

In a fuel cell system 300, the controller 11 is configured to control the inverter 10 and a storage battery 12, as well as to control the raw material gas supplier 13 or the steam supplier 20 (herein, the water supplier 14). By controlling the inverter 10, it is possible to control the target value of the power generation output of the fuel cell system 300. By controlling the storage battery 12, it is possible to, for example, store the electric power obtained by the fuel cell 9 in the storage battery 12, or to perform circuit switching for discharging the storage battery 12.

In the present embodiment, when an increase in the temperature of the methanator 6 is detected, the target value of the power generation output of the fuel cell system 300 is set to be lower than the target value of the power generation output immediately before detection. Thus, the amount of the raw material gas, or the like, supplied to the reformer 4 is adjusted according to the set target value of the power generation output, and the amount of the hydrogen-containing gas generated in the reformer 4 also decreases. The low hydrogen-containing gas operation is performed as described above. Then, during the low hydrogen-containing gas operation, the power generation output of the fuel cell system 300 is limited so that it is less than the power generation output immediately before the determination that there is an increase in the temperature of the methanator 6. Therefore, effects similar to those of the embodiment described above can be obtained. Then, if it is determined that the temperature of the methanator 6 has decreased, the low hydrogen-containing gas operation is stopped, lifting the limitation on the power generation output of the fuel cell system 300. Thus, the normal operation can resume again.

During the low hydrogen-containing gas operation in the present embodiment, the controller 11 may control the operation of the storage battery 12 so that the electric power stored in advance in the storage battery 12 is discharged. Although the power generation output of the fuel cell system 300 during the methanation-suppressed operation decreases below the power generation output during the operation before the low hydrogen-containing gas operation is performed (before the amount of generation of the hydrogen-containing gas is decreased), the lowering of the power generation output during the low hydrogen-containing gas operation can be compensated for by discharging the electric power stored in the storage battery 12.

EXAMPLES AND COMPARATIVE EXAMPLE

Next, the method and results of operating the fuel cell system 300 in Examples and Comparative Example and examining the temperature change of the methanator 6 will be described.

In Examples 1 and 2, during the normal hydrogen-generating operation of the hydrogen generation apparatus, the methanator 6 was heated so as to intentionally increase the temperature of the methanator 6. Then, the low hydrogen-containing gas operation was performed, reducing the amount of generation of the hydrogen-containing gas, and the change in the methanation catalyst temperature was examined. In Examples 1 and 2, the controller 11 was set so that it is determined that there is an increase in the temperature of the methanator 6 when the temperature increase rate of the methanator 6 exceeds 3.5° C./min. The controller 11 was set so as to determine that there is a decrease in the temperature of the methanator 6 when the temperature increase rate of the methanator 6 becomes less than or equal to 3.0° C./min.

On the other hand, for the purpose of comparison, the change in the temperature of the methanation catalyst in a case where the normal operation was continued even after the temperature of the methanator 6 was increased was also examined (Comparative Example).

In these examples and comparative example, a shift converter (not shown) is provided downstream of the reformer 4, and the hydrogen-containing gas having passed through the shift converter is supplied to the methanator 6.

Example 1

In Example 1, first, the fuel cell system 300 was started, and the normal operation was performed while setting (the target value of) the power generation output of the fuel cell system 300 to 750 W. Herein, a city gas 13A was supplied as a hydrocarbon raw material to the hydrogen generator 2. The amounts of the raw material gas and water supplied were adjusted so that the steam/carbon ratio (the S/C ratio) of the raw material and water supplied to the hydrogen generator 2 was 2.8. Moreover, the operation was performed while setting the hydrogen utilization rate at the anode of the fuel cell 9 to 75%.

In this normal operation, the outlet temperature of the reforming catalyst of the reformer 4 was 640° C., and the outlet temperature of the shift catalyst of the shift converter was 200° C. At the outlet of the shift converter, the CO concentration of the hydrogen-containing gas was 4000 ppm and the $CO_2$ concentration was 20%. Moreover, the inlet temperature of the methanation catalyst of the methanator 6 was 240° C., and the outlet temperature of the methanation catalyst was 200° C. The CO concentration of the hydrogen-containing gas at the outlet of the methanator 6 was 15 ppm. The concentration of methane generated through a methanation reaction in the methanator 6 was 3985 ppm.

Then, during the normal operation, the inlet temperature of the methanation catalyst was increased to 280° C. by means of a heater (not shown), emulating an abnormal excessive temperature of the hydrogen generator 2. Then, the power to the heater was turned off.

At a point in time when the inlet temperature of the methanation catalyst was increased to 280° C., an increase in the temperature of the methanator 6 was detected based on the temperature measured by the temperature sensor 7 provided in the methanator 6.

As can be seen from the comparative example to be described below, when the inlet temperature of the methanation catalyst reaches 280° C., for example, if the normal operation is continued while turning off the power to the heater, the inlet temperature of the methanation catalyst further increases, leading to an acceleration of the $CO_2$ methanation reaction.

When an increase in the temperature of the methanator 6 was detected, the controller 11 lowered (the target value of) the power generation output of the fuel cell system 300 from 750 W to 200 W. The amounts of the raw material and water supplied to the hydrogen generator 2 (the reformer 4) were decreased so that the amounts of CO and $CO_2$ in the hydrogen-containing gas supplied to the methanator 6 would decrease to about ⅓ of those before the decreasing. Therefore, in the methanator 6, the amount of heat generation from the methanation reaction was reduced, and the temperature of the methanation catalyst started to decline. Then, about 30 minutes after the detection of an increase in the temperature of the methanator 6, the inlet temperature of the methanation catalyst was successfully lowered to 220° C.

After the inlet temperature of the methanation catalyst was lowered to 220° C., it was maintained at about 220° C. At a point in time when this temperature had been maintained for about 10 minutes, it was determined based on the temperature sensor 7 that the temperature of the methanator 6 was lowered. Thereafter, the limitation on the power generation output of the fuel cell system was lifted by the controller 11, and the power generation output was brought back to 750 W. Thus, the limitation on the amount of hydrogen generated in the hydrogen generation apparatus was also lifted, and the amounts of the raw material gas and water supplied to the reformer 4 were also brought back to those during the normal operation (during the operation before the power generation output was lowered). Thus, the normal operation resumed again.

As the operation was brought back from the low hydrogen-containing gas operation to the normal operation as described above, the inlet temperature of the methanation catalyst gradually increased and was maintained at about 240° C. The temperature increase rate in this process was small, and was 3.5° C./min or less, for example. In a state where the inlet temperature of the methanation catalyst was maintained at about 240° C., the CO concentration in the hydrogen-containing gas at the outlet of the methanation catalyst was 16 ppm. The concentration of methane generated through a methanation reaction in the methanator 6 was 4400 ppm. It can be seen that since the CO concentration in the hydrogen-containing gas introduced into the methanator 6 is 4000 ppm, the CO methanation capability of the methanation catalyst and a high CO selectivity are maintained when the low hydrogen-containing gas operation is performed.

In this example, an excess of electric power during the normal operation was stored by means of the storage battery 12 arranged in the electrical system. The storage battery 12 was discharged when an increase in the temperature of the methanator 6 was detected and the power generation output was lowered. Therefore, even during the operation after the detection of an increase in the temperature of the methanator 6, the required amount of electric power was ensured, thus suppressing the lowering of the usability for electricity consumers.

Example 2

By a method similar to Example 1, the inlet temperature of the methanation catalyst was increased to 280° C. by means of a heater during the normal operation. Then, the power to the heater was turned off.

At this point in time, as in Example 1, an increase in the temperature of the methanator 6 was detected since the temperature increase rate measured by the temperature sensor 7 exceeded 3.5° C./min. After the detection, the controller 11 decreased (the target value of) the power generation output of the fuel cell system 300 from 750 W to 200 W, and controlled the amounts of the raw material gas and water supplied to the reformer 4 so as to increase the S/C ratio of the raw material gas and water supplied to the reformer 4 from 2.8 to 4.0. Therefore, the amount of heat generated through a methanation reaction in the methanator 6 was reduced, thereby lowering the temperature of the methanation catalyst. As a result, the inlet temperature of the methanation catalyst was successfully lowered to 210° C. after about 30 minutes from the detection of an increase in the temperature of the methanator 6.

At a point in time when the inlet temperature of the methanation catalyst had been maintained at 210° C. or less for about 10 minutes, it was determined that the temperature of the methanator 6 had decreased based on the temperature detected by the temperature sensor 7. Thereafter, by means of the controller 11, the limitation on the power generation output of the fuel cell system 300 was lifted so as to bring back the power generation output to 750 W, and the S/C ratio was brought back to 2.8. The limitation on the amount of hydrogen generated in the hydrogen generation apparatus was also lifted, and the amounts of the raw material gas and water supplied to the reformer 4 were also brought back to those during the normal operation (during the operation before the power generation output was lowered). Therefore, the amount of generation of the hydrogen-containing gas in the reformer 4 increased to the amount during the normal operation, and the normal operation resumed again.

As the operation was brought back from the low hydrogen-containing gas operation to the normal operation as described above, the inlet temperature of the methanation catalyst gradually increased and was maintained at about 240° C. The temperature increase rate in this process was small, and was 3.5° C./min or less, for example. In a state where the inlet temperature of the methanation catalyst was maintained at about 240° C., the CO concentration in the hydrogen-containing gas at the outlet of the methanation catalyst was 15 ppm. The concentration of methane generated through methanation in the methanator 6 was 4100 ppm. It can be seen that since the CO concentration in the hydrogen-containing gas introduced into the methanator 6 is 4000 ppm, the CO methanation capability of the methanation catalyst and a high CO selectivity are maintained when the low hydrogen-containing gas operation is performed.

Also in this example, an excess of electric power during the normal operation was stored by means of the storage battery 12 arranged in the electrical system. The storage battery 12 was discharged when an increase in the temperature of the methanator 6 was detected and the power generation output was lowered. Therefore, it was possible to suppress the increase in the temperature of the methanator 6 and to avoid the lowering of the usability.

Comparative Example

By a method similar to Example 1, the normal operation was performed, and the inlet temperature of the methanation catalyst was increased to 280° C. by means of a heater. Then, the power to the heater was turned off.

In Comparative Example, even after the temperature of the methanator 6 was increased by the method described above, the normal operation (output: 750 W, S/C ratio: 2.8) was continued with the power to the heater turned off. As a result, the inlet temperature of the methanation catalyst continued to increase, and was maintained at about 380° C. for one hour. The temperature increase rate was 5.4° C./min or more, for example.

It is believed that the reason for the temperature of the methanation catalyst to continue to increase even after the power to the heater is turned off is that the $CO_2$ methanation is accelerated to proceed significantly when the temperature of the methanation catalyst exceeds 280° C. While the CO methanation and the $CO_2$ methanation are both an exothermic reaction, the $CO_2$ concentration is as high as about 20% whereas the CO concentration is about 0.4%. Therefore, once the $CO_2$ methanation starts to accelerate, the amount of reaction and the amount of heat generation for the methanation reaction of $CO_2$, of which the reactant concentration is high, continue to increase until equilibrium is reached.

In Comparative Example, the $CO_2$ methanation reaction was allowed to accelerate, thereby lowering the catalyst performance of the methanation catalyst. Specifically, after the methanation catalyst was maintained in a state where it was 380° C. for one hour, the CO concentration in the hydrogen-containing gas at the outlet of the methanation catalyst was 20 ppm. The concentration of methane generated through a methanation reaction in the methanator 6 was 8000 ppm. From this, it was found that the CO methanation capability and the CO methanation selectivity of the methanation catalyst would decrease unless the low hydrogen-containing gas operation is performed. Particularly, the CO methanation selectivity lowers significantly, which is undesirable because it would lead to lowering of the efficiency of the hydrogen generation apparatus, an increase in the temperature of the methanation catalyst for $CO_2$ during the normal operation, and hence acceleration of the $CO_2$ methanation.

Although it is not incorporated herein, normally, if the temperature of the methanator increases to such a temperature that the $CO_2$ methanation reaction may possibly accelerate, it is determined to be an abnormal behavior of the hydrogen generation apparatus, and a control operation is performed to halt the operation. If the operation is halted, it is no longer possible to supply the electric power being in demand, thereby significantly lowering the usability for electricity consumers.

Figure 5:
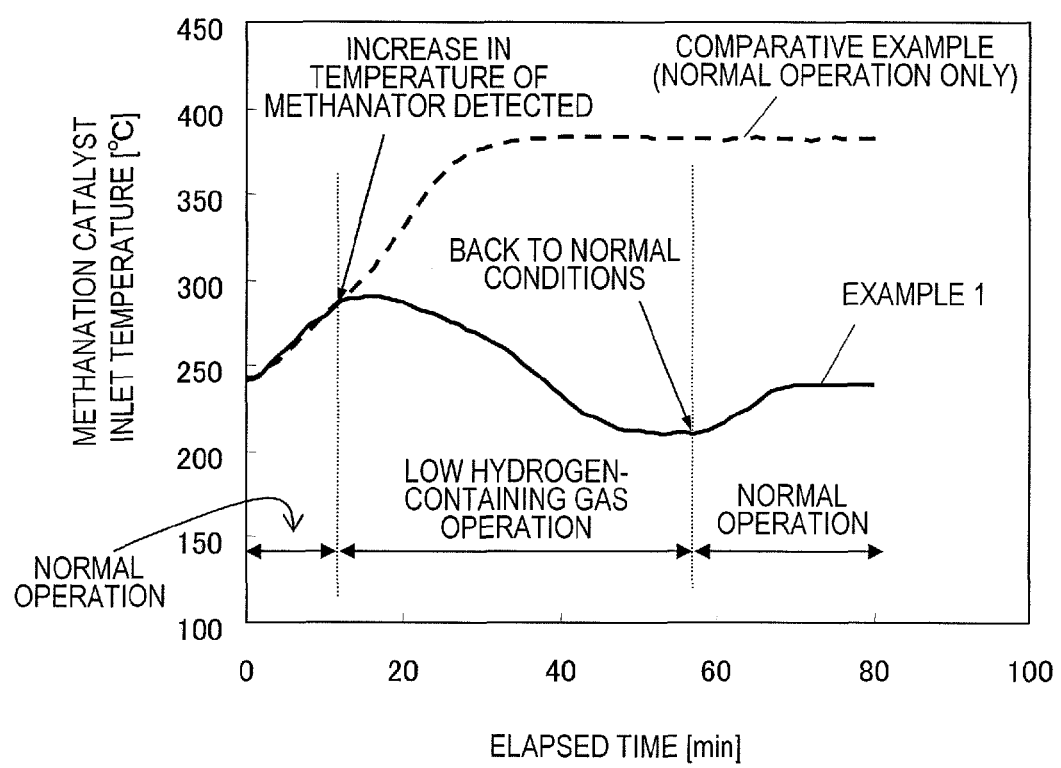
FIG. 5 A graph showing examples of changes in the methane catalyst temperature for Example 1 and Comparative Example.

FIG. 5 is a graph showing the change in the temperature of the methanation catalyst for Example 1 and Comparative Example. FIG. 5 shows the change over time of the inlet temperature of the methanation catalyst, with zero being the point in time when the heating of the methanator 6 was started during the normal operation (the inlet temperature of methanation catalyst: 240° C.)

As can be seen from FIG. 5, in Comparative Example, the temperature of the methanation catalyst continues to increase, and it is believed that it has reached a state where the $CO_2$ methanation reaction has accelerated. In contrast, in Example 1, before the $CO_2$ methanation reaction was accelerated, the operation was switched to the low hydrogen-containing gas operation, and it was therefore possible to stop the increase in the temperature of the methanation catalyst and to lower the methanation catalyst temperature to a predetermined temperature. Moreover, it was possible to resume the normal operation without halting the hydrogen-generating operation of the hydrogen generation apparatus, thus avoiding the lowering of the usability.

INDUSTRIAL APPLICABILITY

The hydrogen generation apparatus of the present invention is used in systems that use a hydrogen-containing gas. Particularly, it is suitably applicable to fuel cell systems having a fuel cell for generating electric power using a hydrogen-containing gas. It can also be used in chemical plants where it is necessary to synthesize hydrogen of a high purity.

REFERENCE SIGNS LIST

1 Hydrogen utilization device
2 Hydrogen generator
3 Burner
4 Reformer
6 Methanator
7 Temperature sensor
9 Fuel cell
10 Inverter
11 Controller
12 Storage battery
13 Raw material gas supplier
14 Water supplier
15 Hydrogen-containing gas passage
16 Evaporator
17 Off-gas passage
20 Steam supplier
100 Hydrogen generation apparatus
200, 300 Fuel cell system

The invention claimed is:

1. A hydrogen generation apparatus comprising:
a reformer for generating a hydrogen-containing gas through a reforming reaction using a raw material gas;
a raw material gas supplier for supplying the raw material gas to the reformer;
a steam supplier for supplying the steam;
a methanator for reducing carbon monoxide contained in the hydrogen-containing gas through a methanation reaction; and
a controller for controlling the raw material gas supplier to decrease an amount of the raw material gas supplied to the reformer so as to decrease an amount of generation of the hydrogen-containing gas when a temperature of the methanator increases,
wherein when the temperature of the methanator increases, the controller controls the steam supplier to increase an amount of the steam supplied to the reformer, in accordance with an amount of decrease in the raw material gas, so that a steam/carbon ratio of the raw material gas and the steam supplied to the reformer becomes higher than the steam/carbon ratio before decreasing the amount of generation of the hydrogen-containing gas.

2. The hydrogen generation apparatus according to claim 1, wherein when the temperature of the methanator decreases, the controller lifts a limitation on the amount of generation of the hydrogen-containing gas.

3. The hydrogen generation apparatus according to claim 2, wherein when the temperature of the methanator decreases, the controller controls the steam supplier so that the steam/carbon ratio of the raw material gas and the steam supplied to the reformer becomes equal to the steam/carbon ratio before decreasing the amount of generation of the hydrogen-containing gas.

4. The hydrogen generation apparatus according to claim 1, wherein when the temperature of the methanator further increases, the raw material gas supplier is controlled so as to stop the supply of the raw material gas to the reformer.

5. A fuel cell system comprising:
the hydrogen generation apparatus according to claim 1 and
a fuel cell for generating electric power using a hydrogen-containing gas supplied from the hydrogen generation apparatus.

6. The fuel cell system according to claim 5, wherein when the temperature of the methanator increases, a power generation output of the fuel cell system is lowered.

7. The fuel cell system according to claim 6, wherein:
the fuel cell system further includes a storage battery; and
when the power generation output of the fuel cell system is lowered, electric power stored in advance in the storage battery is discharged.

8. The hydrogen generation apparatus according to claim 1, wherein the steam supplier includes an evaporator, and the evaporator is arranged so that the evaporator can exchange heat with the methanator.

* * * * *